US010584672B2

United States Patent
Fujita et al.

(10) Patent No.: US 10,584,672 B2
(45) Date of Patent: Mar. 10, 2020

(54) ENGINE STARTING SYSTEM

(71) Applicant: DENSO CORPORATION, Kariya, Aichi-pref. (JP)

(72) Inventors: Tatsuya Fujita, Kariya (JP); Mitsuhiro Murata, Kariya (JP)

(73) Assignee: DENSO CORPORATION, Kariya (JP)

( * ) Notice: Subject to any disclaimer, the term of this patent is extended or adjusted under 35 U.S.C. 154(b) by 123 days.

(21) Appl. No.: 15/686,704

(22) Filed: Aug. 25, 2017

(65) Prior Publication Data
US 2018/0058410 A1 Mar. 1, 2018

(30) Foreign Application Priority Data

Aug. 30, 2016 (JP) .................................. 2016-168545

(51) Int. Cl.
*F02N 11/08* (2006.01)
*F02D 41/06* (2006.01)
*F02D 41/38* (2006.01)

(52) U.S. Cl.
CPC ........ *F02N 11/0848* (2013.01); *F02D 41/062* (2013.01); *F02D 41/38* (2013.01); *F02D 2041/389* (2013.01); *F02N 2200/021* (2013.01)

(58) Field of Classification Search
CPC .. F02D 2041/389; F02D 41/062; F02D 41/38; F02N 11/0848; F02N 2200/021
See application file for complete search history.

(56) References Cited

U.S. PATENT DOCUMENTS

| | | | |
|---|---|---|---|
| 9,745,944 B2 * | 8/2017 | Fujita | ................... F02N 11/105 |
| 10,060,403 B2 * | 8/2018 | Fujita | ................... F02D 41/062 |
| 2003/0041593 A1 * | 3/2003 | Yoshida | ................ F02D 41/042 60/285 |
| 2006/0150938 A1 * | 7/2006 | Kramer | ................ F02D 41/062 123/179.5 |
| 2009/0118992 A1 * | 5/2009 | Moessner | ........... F02N 11/0848 701/113 |
| 2011/0132307 A1 * | 6/2011 | Patterson | ............ F02N 11/0814 123/179.3 |
| 2015/0167613 A1 * | 6/2015 | Fujita | .................. F02N 11/0851 123/179.4 |
| 2015/0275837 A1 | 10/2015 | Fujita et al. | |
| 2018/0135583 A1 * | 5/2018 | Mizuno | ................... F02N 11/00 |

FOREIGN PATENT DOCUMENTS

| | | |
|---|---|---|
| JP | 4421567 B2 | 2/2010 |
| JP | 2010-203346 A | 9/2010 |
| JP | 2012-047104 A | 3/2012 |

* cited by examiner

*Primary Examiner* — Carl C Staubach
(74) *Attorney, Agent, or Firm* — Oliff PLC

(57) ABSTRACT

An engine starting system is provided which is used with a vehicle equipped with a gear driving starter which is energized to bring a pinion gear into engagement with a ring gear of an engine mounted in the vehicle and also to rotate the pinion gear to crank the engine. The engine starting system works to terminate energization of the starter after the starter is energized to start the engine. The engine starting system executes combustion control to control combustion of fuel in the engine so as to develop a first firing event where the fuel is first fired in the engine after the energization of the starter is terminated. This minimizes the gear noise when the engine is being cranked and ensures the stability in starting the engine.

9 Claims, 5 Drawing Sheets

ENGINE STARTING SYSTEM

CROSS REFERENCE TO RELATED DOCUMENT

The present application claims the benefit of priority of Japanese Patent Application No. 2016-168545 filed on Aug. 30, 2016, the disclosure of which is incorporated herein by reference.

BACKGROUND

1 Technical Field

The invention relates generally to an engine starting system.

2 Background Art

Engine starting system which are equipped with a combination of a gear drive type starter and a rotating electrical machine, such as an ISO (Integrated Starter Generator), have been proposed. This type of engine starting systems are designed to activate the starter at an initial stage when a large degree of torque is required to start the engine and then drive the ISG. This enables the ISG to be reduced in size or cost as compared with when the engine starting system is designed to use only the ISO to start the engine.

Japanese Patent No. 4421567 teaches an engine starting device using the above described starter and the ISG. The engine starting device is designed to use the starter (i.e., a starting motor) to crank the engine until the engine is fired for the first time and then use the ISG (i.e., an electrical motor) to crank the engine until the engine is fired up. This improves the startability of the engine with decreased consumption of electric power.

The above engine starting device faces a problem that when the first firing occurs while the starter is being driven, it will result in a rapid rise in speed of the engine, which causes mechanical meshing between a pinion gear of the starter and a ring gear of the engine to generate an intense noise. Specifically, in the event of the first firing of the engine, the speed of the ring gear usually temporarily becomes higher than that of the pinion gear, so that the ring gear impacts the pinion gear, which generates the intense gear noise.

SUMMARY

It is therefore an object to provide an engine starting system which is capable of correctly starting an engine.

According to one aspect of this disclosure, there is provided an engine starting system for a vehicle equipped with a gear drive type starter which is energized to bring a pinion gear into engagement with a ring gear of an engine mounted in the vehicle and also to rotate the pinion gear. The engine starting system comprises: (a) an energization control unit which works to terminate energization of the starter after the starter is energized to start the engine; and (b) a combustion control unit which works to execute combustion control to control combustion of fuel in the engine so as to develop a first firing event where the fuel is first fired in the engine after the energization of the starter is terminated by the energization control unit.

When it is required to start the engine, the engine starting system works to energize the starter to bring the pinion gear into engagement with the ring gear and also rotate a rotating shaft of the starter. Upon termination of the energization of the starter, the pinon gear is disengaged from the ring gear. The starter is also stopped from rotating the rotating shaft thereof. For example, a reactive force, as produced by compression of air in the engine, is maximized just before the top dead center of a piston in a cylinder of the engine is reached, thereby resulting in an increase in pressure acting on tooth faces of the pinion gear and the ring gear, which generates gear noise. After the top dead center of the piston is reached, the reactive force disappears, so that the speed of rotation of the ring gear becomes higher than that of the pinion gear, thereby causing the gear noise to occur which arises from gear collision or gear rubbing between the pinion gear and the ring gear. Such type of gear noise usually become great in the first firing event.

The engine starting system is engineered to terminate the energization of the starter and start executing the combustion control so as to develop the first firing event after the starter is deenergized. This causes actuation of the starter and the combustion control not to be achieved simultaneously during a starting operation to start the engine. The starter is deenergized before the first firing event occurs, thereby enabling the pinion gear to be disengaged from the ring gear prior to the first firing event. In other words, the pinion gear is disengaged from the ring gear before the impact occurs between the pinion gear and the ring gear which results from the first firing event. The gear noise which originates from the reaction caused by the compression of air in the cylinder before the first firing event takes place is also alleviated. This greatly reduces the gear noise which results from the first firing event and enables the engine to be started properly.

In the preferred mode of the invention, the engine starting system also includes a determining unit which determines a first firing top dead center where the first firing event is expected to occur when the starter is rotating the pinon gear to crank the engine. When the first firing top dead center is determined by the determining unit, the energization control unit works to terminate the energization of the starter before the first firing top dead center is reached.

Specifically, the engine starting system determines that the first firing event is expected to occur when the piston in the cylinder of the engine reaches a top dead center in a compression stroke thereof and then deenergizes the starter. This enables the engine to continue to rotate at a speed required to initiate the first firing event in the cylinder after the starter is deenergized, thereby ensuring the stability in completely starting the engine.

When the first firing top dead center is determined by the determining unit, the energization control unit may terminate the energization of the starter at or around a top dead center one cycle earlier than the first firing top dead center.

The ease with which the pinion gear is disengaged from the ring gear is usually facilitated when the pressure exerted on tooth faces of the pinion gear and the ring gear is minimized. In light of such a fact, the engine starting system terminates the energization of the starter at or around the top dead center one cycle earlier than the first firing top dead center. In other words, the starter is deenergized before the reactive force produced by the compression of air in the cylinder is maximized, that is, when the pressure exerted on the tooth faces of the pinion gear and the ring gear has been lowered, thereby facilitating the ease with which the pinion gear is disengaged from the ring gear, which result in a decrease in the gear noise.

The determining unit may determine the first firing top dead center in a condition where a quantity of air with which a cylinder of the engine has been filled is greater than or equal to a given value. When the first firing top dead center is determined by the determining unit, the combustion control unit may initiate the combustion control including controlling spraying of the fuel into the engine using a fuel injector before the first firing top dead center is reached.

The development of the first firing event in the cylinder of the engine requires the cylinder to be sufficiently filled with air. The engine starting system, thus, starts the combustion control in the condition where the cylinder is sufficiently filled with air, thereby achieving the first firing event in the cylinder when the piston thereof reaches the top dead center thereof at a determined time. This enables the starter to be deenergized before the piston reaches the top dead center in a selected cycle of the compression stroke, i.e., the first firing top dead center is reached.

The injector may be engineered to inject the fuel directly into the cylinder of the engine. The combustion control unit starts to actuate the fuel injector to inject the fuel into the engine after the energization of the starter is terminated.

In other words, the engine may be designed to have the fuel injector which sprays fuel directly into the cylinder. After the energization of the starter, the engine starting system may start spraying the fuel in a selected cycle of the compression stoke of the piston in the cylinder immediately before the top dead center is reached in a subsequent cycle of the compression stroke of the piston, thereby achieving the first firing of fuel at the first firing top dead center.

The energization control unit may terminate the energization of the starter immediately before a top dead center one compression cycle earlier than the first firing top dead center, as determined by the determining unit.

The development of the first firing event after the completion of energization of the starter requires the inertial rotation of the engine to be increased more than the reactive force resulting from the compression of air in the cylinder. The engine starting system continues to rotate the starter until just before the top dead center one compression cycle earlier than the first firing top dead center, thereby providing a degree of inertia rotation to the engine which is required for the piston in the cylinder to pass over the top dead center after the starter is deenergized, thereby ensuring the stability in achieving the first firing event in the engine without undesirably decreasing the speed of the engine.

The engine starting system may also include an air quantity control unit which increase an quantity of air sucked into the engine when the starter is rotating the pinon gear to crank the engine.

The development of the first firing event after the completion of energization of the starter requires a drop in speed of the engine to be minimized after the starter is deenergized. The engine starting system may be designed to increase the quantity of air with which the cylinder is filled. This, however, results in an increase in the reactive force generated by the compression of air in the cylinder. The increase in the reactive force will cause the speed of the engine to be desirably increased in the expansion stroke, thereby minimizing the drop in speed of the engine after the starter is deenergized and ensuring the stability in achieving the first firing event.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENT

An engine starting system according to an embodiment will be described below with reference to the drawings. Throughout the drawings, the same reference numbers refer to the same parts, and duplicated explanation thereof will be omitted here.

Figure 1:
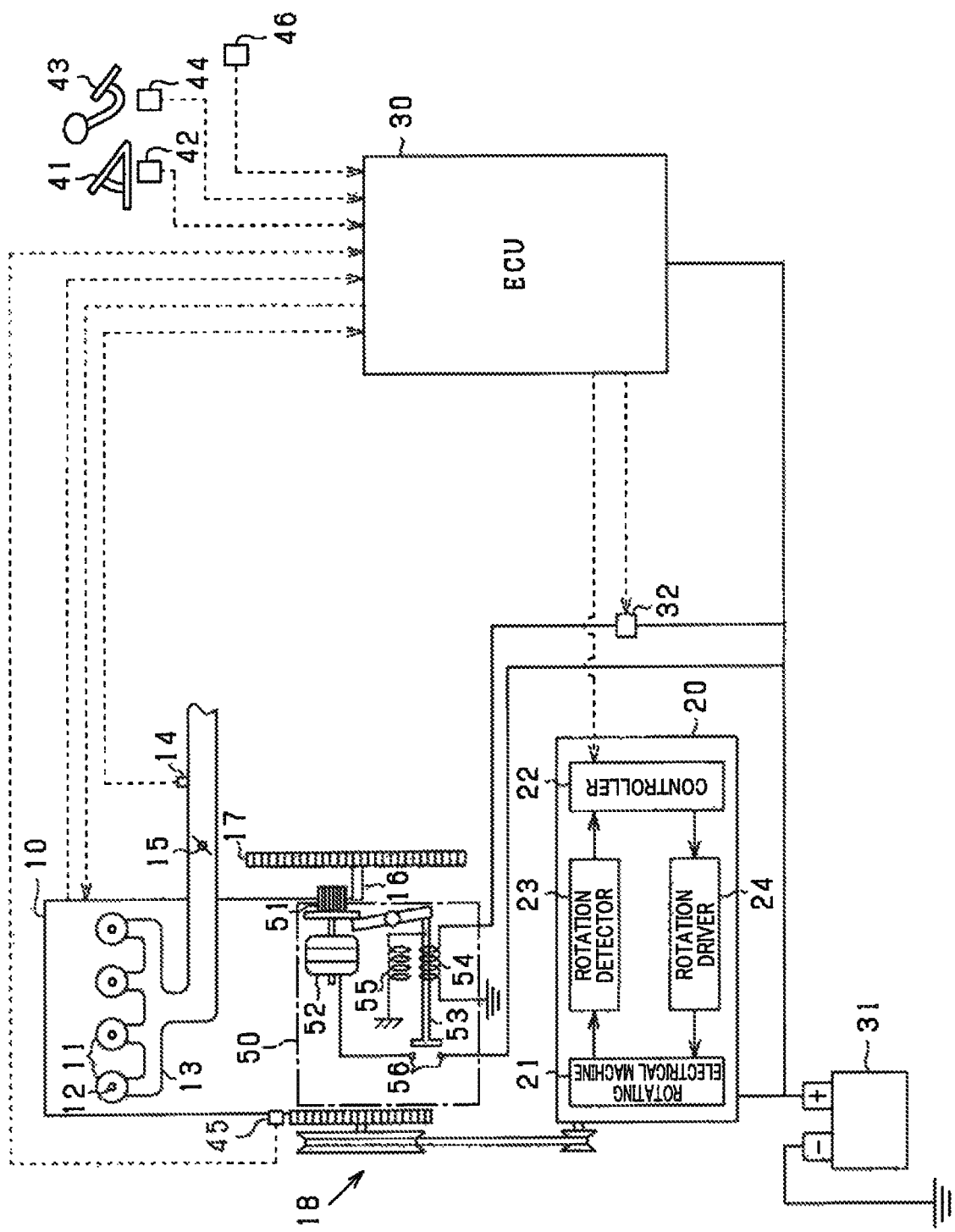
FIG. 1 is a block diagram which illustrates an engine starting system according to an embodiment.

The engine starting system is installed in a vehicle such, as an automobile, in which an engine 10 is mounted as a drive source. The engine 10 is, as illustrated in FIG. 1, a multi-cylinder internal combustion engine driven by combustion of fuel such as gasoline or light oil and equipped with known ignition devices. In this embodiment, the engine 10 is implemented by a cylinder injection engine (e.g., a direct injection engine) and equipped with cylinders 11. The electromagnetic fuel injectors 12 are installed one in each of the cylinders 11 and work to spray fuel directly into the cylinders 11.

The intake pipe 13 delivers air to the cylinders 11. The intake pipe 13 has installed therein the air flow meter 14 which measures how much air (i.e., an intake air flow) is being delivered into the cylinders 11. The throttle valve 15 is mounted downstream of the air flow meter 14 and serves to regulate the intake air flow.

The engine 10 is also equipped with the starter 50 that is a gear drive type and works as a first starter. The starter 50 is designed as a pinion shift starter and equipped with the pinion gear 51, the electrical motor 52 which rotates the pinion gear 51, the plunger 53, the coil 54 which is energized to move the plunger 53 in an axial direction thereof, and the return spring 55.

The pinion gear 51 is mounted on a rotating shaft (i.e., an output shaft) of the starter 50 to be engageable with the ring gear 17 mounted on the engine rotating shaft 16. The plunger 53 functions as an actuator or driver to achieve the engagement of the pinion gear 51 with the ring gear 17. When it is required to start the engine 10, the starter 50 is energized to move the pinion gear 51 through the plunger 53 into engagement with the ring gear 17, so that output torque of the starter 50 is transmitted to the engine rotating shaft 16.

The starter 50 is electrically joined to the battery 31. Specifically, the coil 54 and the battery 31 are connected together through the relay 32. The motor 52 and the battery 31 are connected through the contacts 56. When the relay 32 is energized or closed, electrical power is delivered from the battery 31 to the coil 54. The coil 54 is then energized to shift the pinion gear 51 through the plunger 53 to a location where the pinion gear 51 is engageable with the ring gear 17.

Simultaneously, the movement of the plunger 53 to shift the pinion gear 51 will cause the contacts 56 to be closed, so that the motor 52 is rotated, thereby rotating the ring gear 17 through the pinion gear 51 to apply initial torque to the engine 10. This cranks or starts the engine 10.

When the relay 32 is opened, it stops the supply of electric power from the battery 31 to the coil 54, so that the starter 50 is deenergized. When the supply of electric power to the coil 54 is cut, it causes the return spring 55 to attract the pinion gear 51 to the initial position thereof through the plunger 53, thereby disengaging the pinion gear 51 from the ring gear 17. The movement of the plunger 53 also opens the contacts 56 to stop the motor 52 from rotating.

The alternator 20 is connected to the engine rotating shaft 16 through the power transmission mechanism 18 which includes pulleys and a belt. The alternator 20 works as a belt-driven second starter to selectively transmit torque to the engine rotating shaft 16. The alternator 20 is joined to the engine rotating shaft 16 through the power transmission mechanism 18 at all times. The alternator 20 selectively operates in one of a motor mode and a generator mode (also called a regenerative mode). When it is required to supply the power to the engine rotating shaft 16, the alternator 20 enters the motor mode. Alternatively, when it is required to convert the output of the engine 10 into electrical power, the alternator 20 enters the generator mode.

The starter 50 is engineered as an engine starter which is electrically energized, so that it is rotated, while the alternator 20 is engineered as an engine starter whose rotational speed is controlled in the motor mode. The starter 50 is of a low-speed type to produce a relatively great degree of torque, while the alternator 20 is of a high-speed type.

The alternator 20 is equipped with the rotating electrical machine 21, the controller 22, the rotation detector 23 working to measure a flow of electrical current through the rotating electrical machine 21, and the rotation driver 24 working to deliver electrical power to the rotating electrical machine 21. The rotating electrical machine 21 is designed as a three-phase AC electrical rotating machine to have a known structure equipped with a rotor coil wound around a rotor and a stator coil wound around a stator. The rotation driver 24 is implemented by a known inverter circuit equipped with a plurality of switching devices, i.e., MOS-FETs and works to convert dc power, as delivered from the battery 31, into ac power and supply it to the rotating electrical machine 21. The rotation driver 24 also works to convert ac power, as delivered from the rotating electrical machine 21, into dc power and supply it to the battery 31. The battery 31 works as an electrical power supply to deliver the electrical power to the starter 50 and the alternator 20.

The controller 22 works to control the speed of rotation of the alternator 20. When it is required to operate the alternator 20 in the motor mode, the controller 22 actuates the rotation driver 24 to convert dc power from the battery 31 into three-phase electric power and delivers it to the stator coil. The controller 22 also analyzes a value of electric current, as measured by the rotation detector 23, to control the operation of the rotation driver 24 for bringing the speed of the rotating electrical machine 21 into agreement with a target value.

When the alternator 20 is placed in the generator mode, the stator coil generates ac induced electromotive force whose frequency depends upon the speed of the rotating electrical machine 21. The rotation detector 23, therefore, measures such induced electromotive force to determine the speed of the rotating electrical machine 21.

The alternator 20 of this embodiment is engineered to have a sensor-less structure which is not equipped with a rotation sensor. The rotation detector 23 works to measure induced voltage or induced current, as generated in the rotor coil or the stator coil by rotation of the rotor of the rotating electrical machine 21. The controller 22 analyzes the induced voltage or current, as measured by the rotation detector 23, to determine that the rotating electrical machine 21 is rotating or determine a target one of phase windings of the rotating electrical machine 21 which should be excited. The controller 22 then excites the target phase winding to drive the rotating electrical machine 21 in the motor mode.

The speed of rotation of the rotating electrical machine 21 and a speed reduction ratio of the power transmission mechanism 18 may be used to calculate the engine speed NE that is the speed of rotation of the engine rotating shaft 16. The engine rotating shaft 16 is connected to wheels of the vehicle through a clutch and a transmission (not shown). Such arrangements are known, and explanation thereof in detail will be omitted here.

The engine starting system is also equipped with the ECU (Electronic Control Unit) 30. The EUC 30 is made of a known electronic control unit equipped with a microcomputer and works to analyze outputs from various sensors installed therein to execute control tasks for the engine 10. The ECU 30 is connected to the controller 22 to establish intercommunication therebetween. The ECU 30 is electrically connected to the battery 31 and operated by electric power delivered from the battery 31.

The above sensors include the accelerator position sensor 42, the brake sensor 44, the speed sensor 45, the vehicle speed sensor 46, and the air flow meter 14. The accelerator position sensor 42 works to measure the position of the accelerator pedal 41, i.e., a driver's effort on the accelerator pedal 41 which serves as an acceleration operating member. The brake sensor 44 works to measure the position of the brake pedal 43. The speed sensor 45 works to measure the angular position of the engine rotating shaft 16 at a given angular interval thereof for determining the speed of the engine rotating shaft 16. The vehicle speed sensor 46 works to measure the speed of the vehicle. These sensors provide outputs to the ECU 30. The engine starting system is also equipped with other sensors (not shown).

The ECU 30 uses outputs of the above sensors to control the quantity of fuel to be sprayed from the fuel injectors 12 into the engine 10 and the ignition of fuel using the ignition devices in the engine 10. The ECU 30 also works to control an on-off operation of the starter 50, that is, achieve connection or disconnection of the relay 32. The ECU 30 also controls a known idle stop mode of the engine 10. Specifically, in the idle stop mode, the ECU 30 automatically stops the engine 10 when given automatic engine stop conditions are encountered and then automatically restarts the engine 10 when given engine restart conditions are met. The automatic engine stop and restart conditions include the speed of the vehicle, the accelerating operation, and the braking operation.

The engine starting system of this embodiment is designed to use both the starter 50 and the alternator 20 when it is required to start the engine 10 for the first time or automatically restart the engine 10. Specifically, the engine starting system first uses the starter 50 to crank the engine 10 at an initial engine starting stage to apply initial torque to the engine rotating shaft 16 and then uses the alternator 20 to continue cranking the engine 10.

Figure 2:
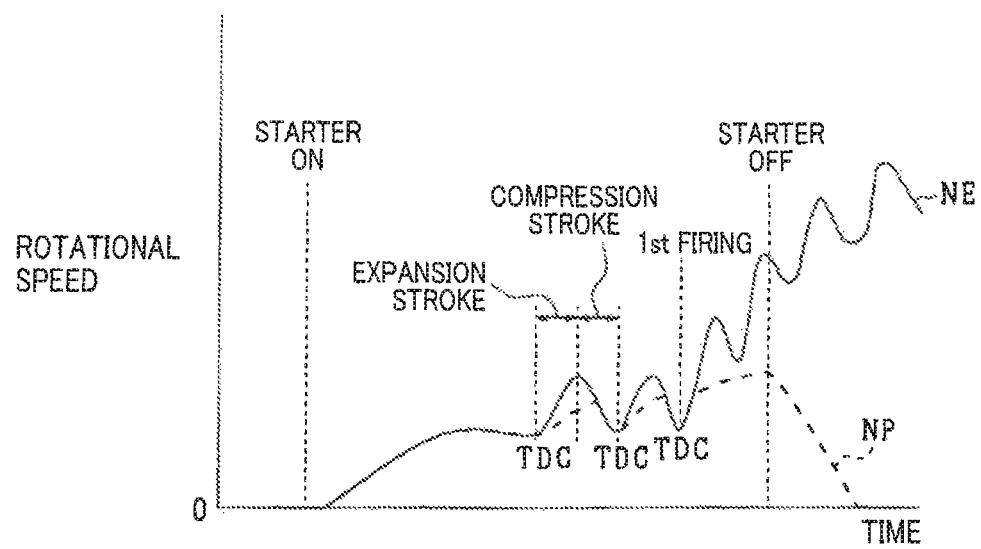
FIG. 2 is a time chart which demonstrates an engine starting operation in relation to speed of an engine in the engine starting system of FIG. 1.

When the engine 10 is required to be started, the starter 50 is first actuated to crank the engine 10. The engagement between the pinion gear 51 and the ring gear 17 while the engine 10 is being cranked will be described using FIG. 2. FIG. 2 demonstrates an example where a four-cylinder engine is first fired during the cranking thereof.

First, the starter 50 is energized to bring the pinion gear 51 into engagement with the ring gear 17. The starter 50 also starts rotating a rotating shaft thereof to crank the engine 10. The ring gear 17 is then pressed by tooth faces of the pinion gear 51 (which will also be referred to below as driving tooth faces), so that it rotates and starts cranking the engine 10. After the engine 10 starts being cranked, the speed of the pinion gear 51 (which will also be referred to as a pinion speed NP) and the speed of the engine 10 (which will also be referred to as an engine speed NE) are increased. The engine speed NE is then subjected to reaction caused by compression of an air-fuel mixture in the engine 10, so that it drops as the top dead center is approached. This results in an increase in degree of pressure exerted on the driving tooth faces of the pinion gear 51 and the ring gear 17, which will generate mechanical noise (i.e., gear noise).

After the top dead center is passed, the engine speed NE will be increased with an increase in volume of the combustion chamber of the engine 10. The engine speed NE temporarily becomes higher than the pinion speed NP, that is, the speed of the ring gear 17 temporarily becomes greater than that of the pinion gear 51 after the top dead center is passed. When the piston of the engine 10 changes from the compression stroke to the expansion stroke, the pressure exerted on the driving tooth faces of the pinion gear 51 and the ring gar 17 decreases, so that the driving tooth faces of the pinion gear 51 which were placed in contact with those of the ring gear 17 before the top dead center in the compression stroke temporarily leave the ring gear 17. This causes tooth faces of the pinion gear 51 which are opposed to the driving tooth faces thereof to impact the ring gear 17, which generates the gear noise arising from gear collision or gear rubbing.

Subsequently, when the compression stroke is entered again, so that the engine speed NE drops, it will cause the driving tooth faces of the pinion gear 51 to mechanically impact the ring gear 17 again, thereby making the gear noise.

When the first firing occurs during the cranking of the engine 10, it will cause the engine speed NE (i.e., the speed of rotation of the ring gear 17) to be quickly increased by torque of the piston produced by the first firing. This causes the ring gear 17 to impact the pinion gear 51, thereby generating the gear noise. Particularly, in the event of the first firing, the energy of impact on the ring gear 17 and the pinion gear 51 becomes great, thus resulting in intense gear noise.

In order to alleviate the above problems, the engine starting system of this embodiment is engineered to electrically energize and then deenergize the starter 50 and start controlling the combustion of fuel in the engine 10 so that the first firing occurs after the deenergization of the starter 50. This causes the actuation of the starter 50 and the control of combustion in the engine 10 not to be executed simultaneously when the engine 10 is started, thereby alleviating the gear noise arising from the reaction caused by the compression of the air-fuel mixture in the engine 10 before the first firing and also reducing the above described impact or rubbing noise resulting from the first firing. The deenergization of the starter 50 is achieved in the following way. The engine starting system calculates a first firing top dead center TDCX that is the top dead center of the piston where the first firing of fuel will occur in the compression stroke of the piston when the starter 50 is cranking the engine 10 and then terminates the energization of the starter 50 before the first firing top dead center TDCX is reached.

The engine starting system is also designed to achieve the first firing at a desired top dead center in the compression stroke of the piston. Specifically, the engine starting system starts controlling the combustion of fuel in the engine 10 in addition to the injection of fuel into the engine 10 in a condition where the cylinder of the engine 10 is filled with a desired quantity of air, thereby achieving the termination of energization of the starter 50 at a desired time based on the first firing top dead center TDCX. In this embodiment, the engine starting system calculates a compression top dead center TDCY of the piston immediately before the first firing top dead center TDCX and then terminates the energization of the starter 50 immediately before the compression top dead center TDCY.

Figure 3:
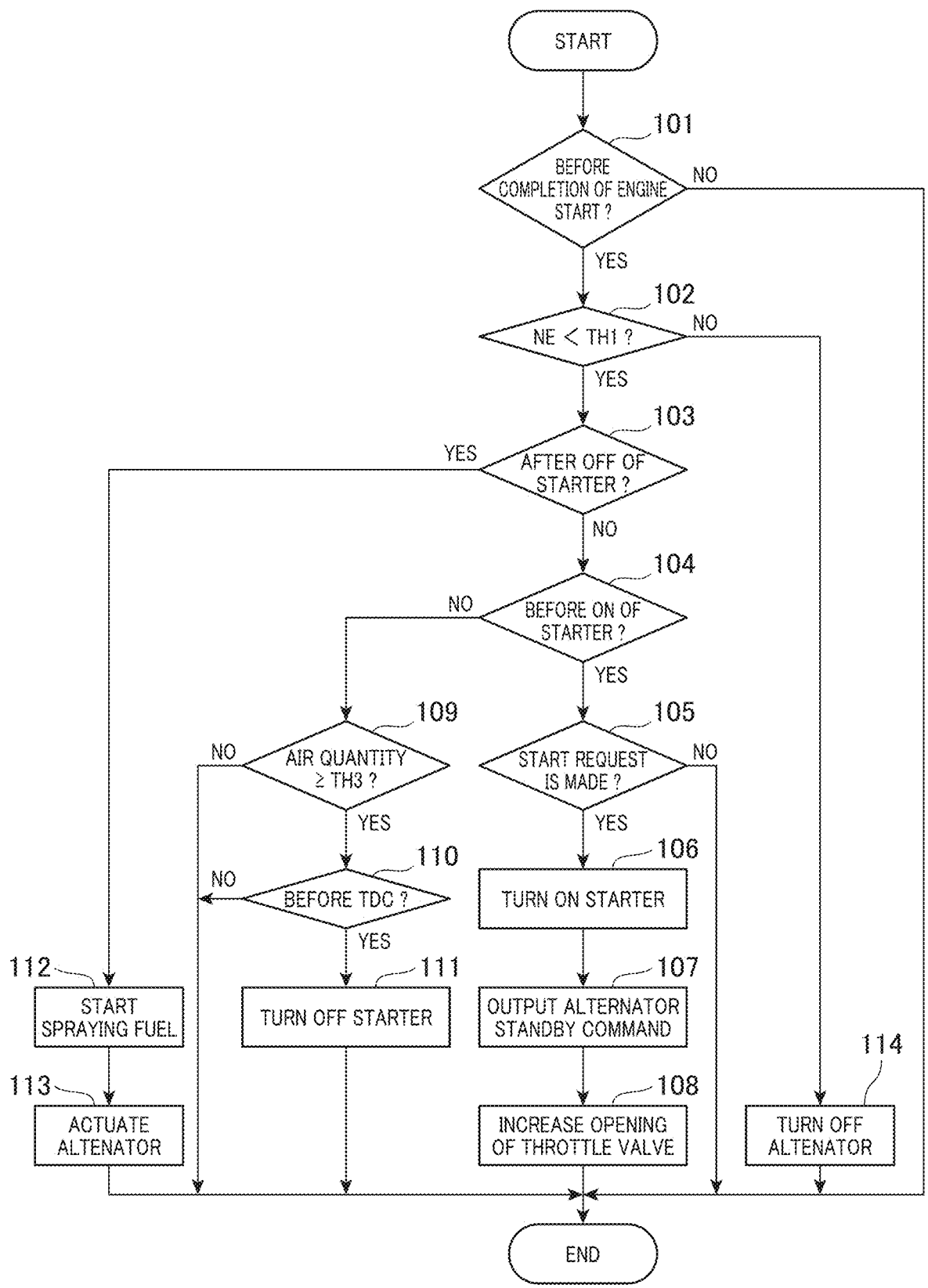
FIG. 3 is a flowchart of a starting control program to be executed by an ECU installed in the engine starting system of FIG. 1.

FIG. 3 is a flowchart of a sequence of logical steps or program executed by the ECU 30 in a selected control cycle.

After entering the program, the routine proceeds to step S101 wherein it is determined whether a starting operation to start the engine 10 is not yet completed or not. For instance, when the engine 10 has been automatically stopped in the idle stop mode, but before having been completely restarted, a YES answer is obtained in step S101. When the engine 10 has been restarted, the routine then terminates. If a YES answer is obtained in step S101 meaning that the starting operation is not yet finished, then the routine proceeds to step S102, wherein it is determined whether the engine speed NE is lower than a given threshold value TH1 or not. The threshold value TH1 is used as a reference value in determining whether the motor mode of the alternator 20 should be stopped or not. The threshold value TH1 is set to, for example, 500 rpm. If a YES answer is obtained in step S102, then the routine proceeds to step S103. Alternatively, if a NO answer is obtained, then the routine proceeds to step S114.

In step S103, it is determined whether the starter 50 has been already switched from the on-state to the off-state in this engine starting cycle or not. In the case where the energization of the starter 50 is terminated immediately before the compression top dead center TDCY just prior to the first firing top dead center TDCX, a YES answer is obtained in step S103 after the piston has passed the compression top dead center TDCY. If a YES answer is obtained in step S103, then the routine proceeds to step S112. Alternatively, if a NO answer is obtained, then the routine proceeds to step S104.

In step S104, it is determined whether it is before the starter 50 is turned on or not. Specifically, it is determined whether the relay 32 is still kept opened or not. If a YES answer is obtained in step S104 meaning that the starter 50 is not yet energized, then the routine proceeds to step S105 wherein it is determined whether a start request to start the engine 10 has been made or not. When a restart request is made after the engine 10 is automatically stopped, a YES answer is obtained in step S105. The routine then proceeds to step S106. A NO answer is obtained in step S105 until the restart request is made after the engine 10 is automatically stopped. The routine then terminates.

In step S106, the starter 50 is electrically energized or turned on. Specifically, the relay 32 is closed to deliver electrical power to the starter 50. The routine then proceeds to step S107 wherein the ECU 30 outputs an alternator drive standby command to the controller 22. The routine then proceeds to step S108 wherein the degree of opening of the throttle valve 15 is increased, that is, the throttle valve 15 is further opened to increase the quantity of air sucked into the engine 10. The operation in step S108 serves as an air quantity control unit.

After the starter 50 starts to be energized, a NO answer is obtained in step S104. The routine then proceeds to step S109 wherein it is determined whether a condition where the quantity of air with which the cylinder 11 is filled is greater than or equal to a threshold value TH3 is met or not. The determination in step S109 is to determine whether if the fuel combustion control including the fuel injection control is now performed, a target one of the cylinders 11 for which the fuel combustion control is executed is expected to undergo the first firing event or not, i.e. whether one of the cylinders 11 which will be next subjected to the compression stroke of the piston is a cylinder (which will also be referred to below as a first firing cylinder) in which the fuel is expected to be burned for the first time or not, and whether the top dead center of the piston in the first firing cylinder is the first firing top dead center TDCX or not. The operation in step S109 serves as a determining unit to determine the top dead center (i.e., the first firing top dead center TDCX) of the piston in the cylinder 11 in which the first firing is expected to occur. The quantity of air with which the cylinder 11 is filled is calculated in a known way, for example, as a function of the quantity of intake air, as measured by the air flow meter 14, and the engine speed NE. The threshold value TH3 is a reference value which represents the quantity of air required for creating the first firing in the cylinder 11. If a YES answer is obtained in step S109 meaning that the first firing top dead center TDCX is determined, then the routine proceeds to step S110.

In step S110, it is determined whether an angular position of the engine 10 (i.e., an angular position of the crankshaft of the engine 10) is just before the top dead center of the piston in the compression stroke nor not. In other words, in the condition where the quantity of air with which the cylinder 11 is filled is sufficient for achieving the first firing, i.e., a YES answer is obtained in step S109, so that the combustion control is permitted to be initiated, it is determined in step S110 whether the position of the piston in the target cylinder 11 is just before the compression top dead center TDCY just prior to the first firing top dead center TDCX or not. An angular position of the crankshaft of the engine 10 (e.g., BTDC 45° to 5° CA) before the compression top dead center TDCY will be referred to in this disclosure as a just-before position. If a YES answer is obtained in step S110, then the routine proceeds to step S111 wherein the starter 50 is deenergized. Specifically, the relay 32 is opened to cut the supply of electrical power to the starter 50. This causes the pinion gear 51 is brought by the return spring 55 into disengagement from the ring gear 17.

If a NO answer is obtained in step S109 or S110, then the routine terminates. The starter 50, therefore, continues to be energized. The operation in step S109 serves as a determining unit. The operations in step S110 and S111 serve as an energization control unit.

If a YES answer is obtained in step S103 after the starter 50 is turned off, then the routine proceeds to step S112 wherein it is determined that the fuel injector 12 should be subsequently opened, that is, the fuel injection should be initiated. This starts spraying fuel into the target cylinder 11 of the engine 10 to achieve the first firing of the fuel in the target cylinder 11 at a time when the top dead center of the piston in the target cylinder 11 is subsequently reached, that is, the first firing top dead center TDCX is reached. The engine 10, as referred to in this embodiment is of a direct injection type in which the fuel is sprayed into the target cylinder 11 in the compression stroke immediately before the first firing top dead center TDCX is reached. The operation in step S112 serves as a combustion control unit.

The routine then proceeds to step S113 wherein an alternator drive command is outputted to the controller 22. The controller 22 then actuates the alternator 20 in the motor mode to increase the engine speed NE. If a YES answer is obtained in step S102 in the next program execution cycle, then the routine proceeds to step S114 wherein an alternator off-signal is outputted to the controller 22 to stop the motor mode of the alternator 20. The routine then terminates to complete the starting operation for the engine 10.

Figure 4:
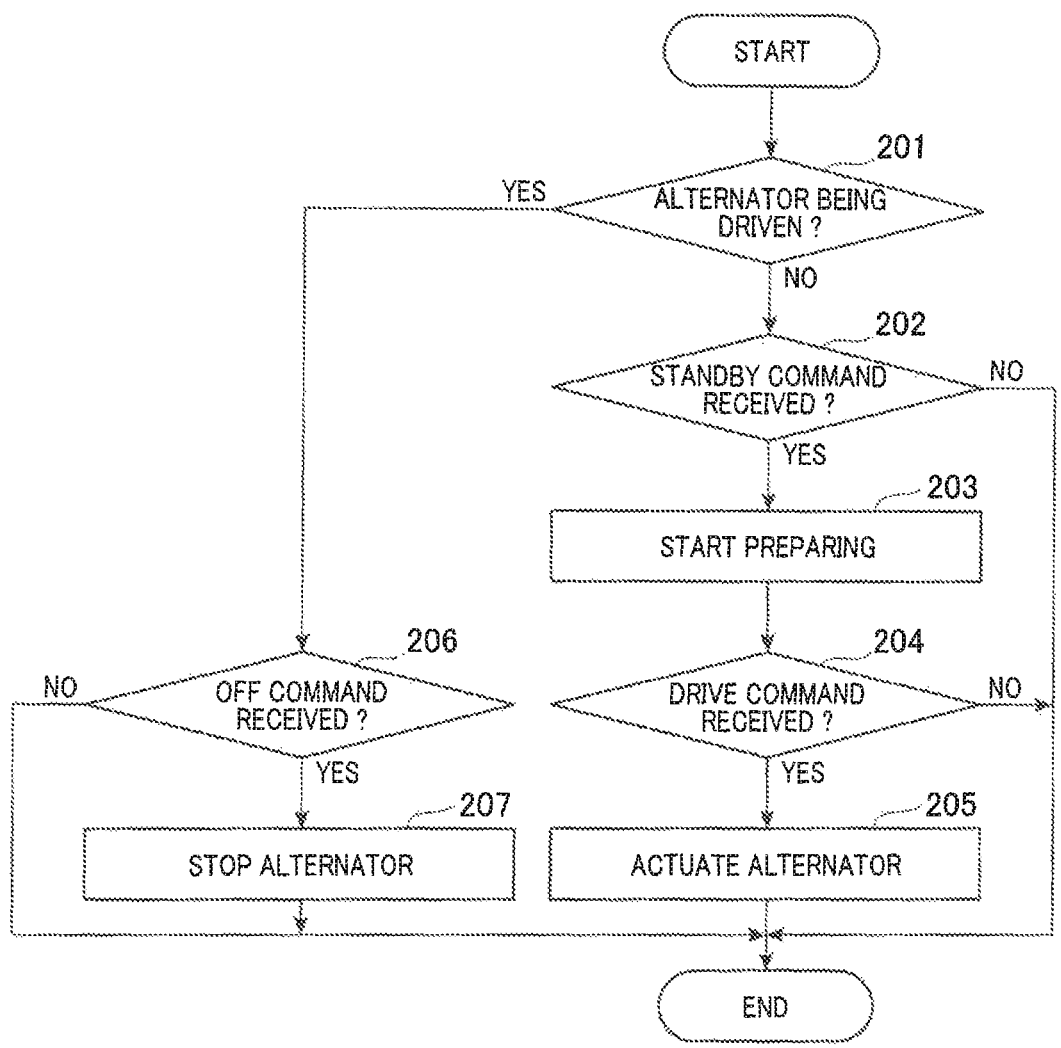
FIG. 4 is a flowchart of an alternator operation control program to be executed by an ECU installed in the engine starting system of FIG. 1.

FIG. 4 represents drive control for the alternator 20 which is executed by the controller 22 in a given control cycle which may be identical with or different from that in the ECU 30.

After entering the program, the routine proceeds to step S201 wherein it is determined whether the alternator 20 is now operating or not. If a YES answer is obtained meaning that the alternator 20 is being driven, then the routine proceeds to step S206. Alternatively, if a NO answer is obtained, then the routine proceeds to step S202 wherein it is determined whether the alternator drive standby command, as outputted from the ECU 30, has been received by the controller 22 or not. If a YES answer is obtained, then the routine proceeds to step S203. Alternatively, if a NO answer is obtained, then the routine terminates. In step S203, the controller 22 prepares for actuating the alternator 20. Specifically, the rotation detector 23 measures the induced electromotive force generated in the rotating electrical machine 21 to determine the speed of rotation of the rotating electrical machine 21.

The routine then proceeds to step S204 wherein it is determined whether it is after the controller 22 has received the alternator drive command from the ECU 30 or not, that is, whether the alternator 20 is permitted to operate in the motor mode or not. If a NO answer is obtained in step S204 meaning that the alternator 20 is inhibited from operating in the motor mode, the routine then terminates without placing the alternator 20 in the motor mode. Alternatively, if a YES answer is obtained in step S204 meaning that the alternator 20 is permitted to be driven in the motor mode, then the routine proceeds to step S205 wherein the drive control is executed to drive the alternator 20.

When the alternator 20 starts to be driven, a YES answer is obtained in step S201. The routine then proceeds to step S206 wherein it is determined whether the controller 22 has received the alternator-off signal from the ECU 30 or not. If a NO answer is obtained, then the routine terminates, so that the controller 22 continues to drive the alternator 20. Alternatively, if a YES answer is obtained, then the routine proceeds to step S207 wherein the controller 22 stops operating the alternator 20 to complete the starting operation for the engine 10.

Figure 5:
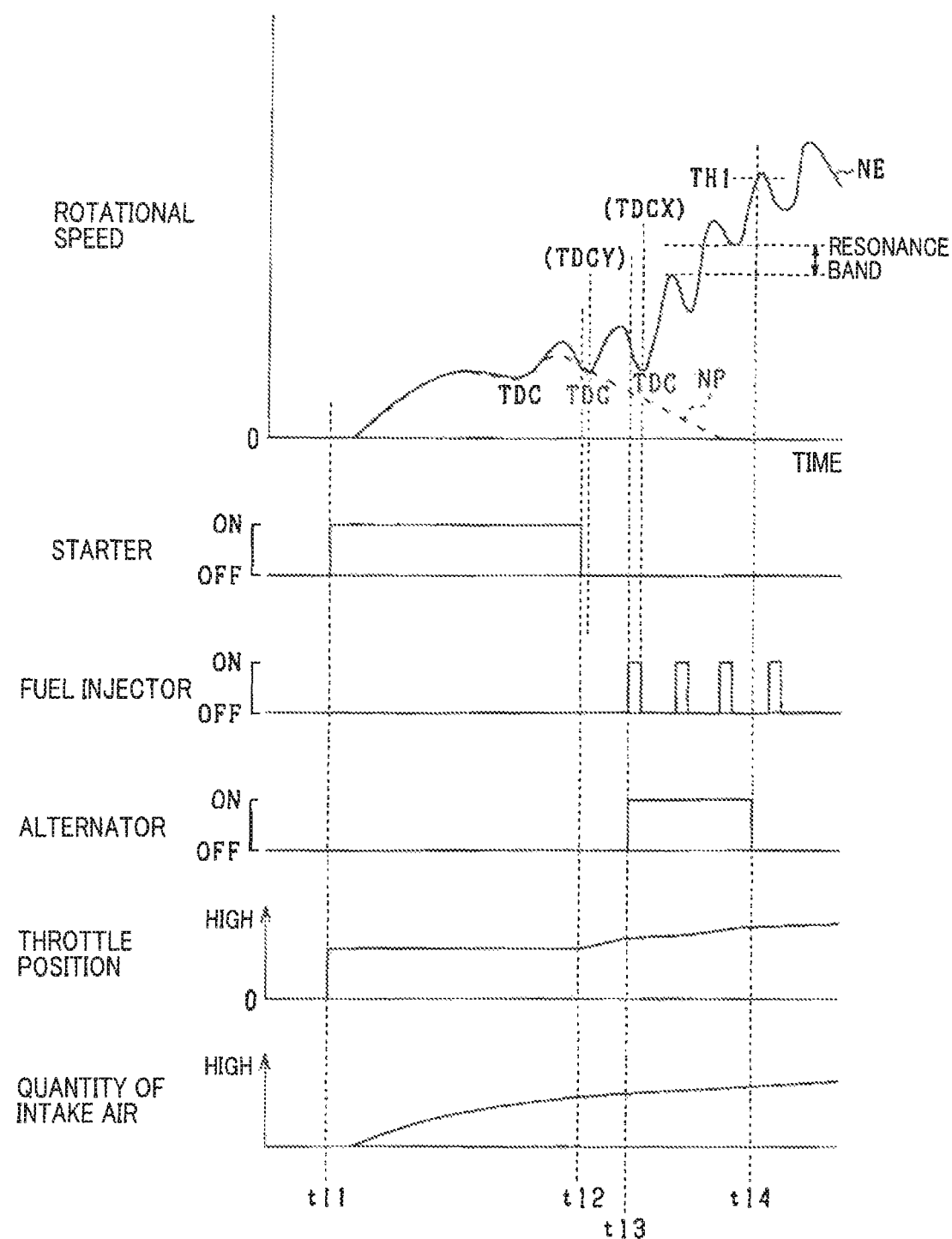
FIG. 5 is a time chart which demonstrates a sequence of engine starting operations performed by the engine starting system of FIG. 1.

FIG. 5 is a time chart which represents operations of the engine starting system to start the engine 10. FIG. 5 demonstrates an example where the engine 10 is automatically stopped and then restarted.

Before time t11, the engine 10 is at rest. At time t11, the driver of the vehicle makes a start request for the engine 10. Specifically, when the driver depresses the accelerator pedal 41 or releases the brake pedal 43, the start request is made. For instance, in a case where it is required to start the engine 10 for the first time, the start request is produced upon turning on an ignition key of the vehicle by the driver.

When the start request is made, the ECU 30 starts energizing the starter 50 to crank the engine 10. The ECU 30 also opens the throttle valve 15 to a degree greater than in a normal automatic engine restart mode. Upon cranking of the engine 10, the pinion speed NP of the starter 50 increases, so that the engine speed NE is elevated.

The engine speed NE usually decreases due to reaction caused by compression of volume of the combustion chamber in the cylinder 11 as the piston approaches the top dead center and then increases with an increase in volume of the combustion chamber after the piston passes the top dead center. Usually, after the piston passes the top dead center, the engine NE (i.e., the speed of rotation of the ring gear 17) temporarily becomes higher than the pinion speed NP.

After the throttle valve 15 is, as described above, opened to the greater degree, an increase in quantity of intake air delivered into the engine 10 with time will result in an increase in quantity of air with which the cylinder 11 is filled. At time t12, the quantity of air with which the cylinder 11 is filled reaches a required level. In other words, the quantity of air with which the cylinder 11 is filled is greater than or equal to the threshold value TH3. When the angular position of the engine 10 (i.e., the position of the piston in the target cylinder 11) reaches a position just before the top dead center in the compression stoke, the starter 50 is turned off. At time t12, when the combustion control including the fuel injection control is performed, the target cylinder 11 for which the fuel combustion control is executed is expected to undergo the first firing event. The starter 50 is, therefore, deenergized. Specifically, as described already, the starter 50 is turned off when the piston in the target cylinder 11 reaches a position immediately before the compression top dead center TDCY immediately prior to the first firing top dead center TDCX where the first firing of the fuel is expected to occur. This causes the pinion gear 51 to be disengaged from the ring gear 17, so that the pinion speed NP drops with time.

When the starter 50 is turned off before the first firing occurs, the disengagement of the pinion gear 51 from the ring gear 17 is achieved before the engine speed NE is rapidly increased by the first firing of the fuel. This eliminates the gear noise originating from the impact between the pinion gear 51 and the ring gear 17 in the event of the first firing and also results in a decrease length of time required to crank the engine 10, which reduces the gear noise caused by the cranking of the engine 10. The pressure in the target cylinder 11 is usually maximized at the top dead center. The torque acting on the engagement between the pinion gear 51 and the ring gear 17 is also maximized at the top dead center. However, the starter 50 is turned off before the top dead center is reached, thus maximizing the reduction in gear noise.

After time t12, the starter 50 produces torque to crank the engine 10, but the engine 10 (i.e., the engine rotating shaft 16) continues to be rotated by inertial force thereof, so that the piston reaches the next top dead center (i.e., the first firing top dead center TDCX). The engine starting system of this embodiment is, as described above, designed to actuate the starter 50 immediately before the compression top dead center TDCY just prior to the first firing top dead center TDCX, thereby ensuring the stability to move the piston in the target cylinder 11 over the first firing top dead center TDCX. The engine starting system, as described above, also works to open the throttle valve 15 to a greater degree, thereby assisting in exerting the torque on the engine 10 which is great enough to move the piston over the first firing top dead center TDCX. This reduces a drop in speed of the engine 10 after the starter 50 is turned off and ensures the stability in moving the piston over the first firing top dead center TDCX.

After the starter 50 is turned off, the fuel injector 12 is actuated to spray the fuel into the target cylinder 11. In the example of FIG. 5, the fuel injector 12 starts spraying the fuel into the cylinder 11 in the combustion stroke at time t13 just before the first firing top dead center TDCX. Simultaneously, the ECU 30 outputs the alternator drive signal to the controller 22. The first firing then occurs at a time when the first firing top dead center TDCX is reached.

Afterwards, the alternator 20 starts operating in the motor mode. The drive torque, as produced by the alternator 20, and torque, as produced by combustion of fuel in the cylinder 11, increase the engine speed NE, thereby moving the piston quickly over a resonance range during the increase in the engine speed NE.

Specifically, the engine 10 usually has a resonance range where the engine 10 undergoes resonance during rotation thereof. The resonance range usually lies between 300 rpm to 400 rpm which is lower than an idle speed. The speed at which the engine 10 is cranked by the starter 50 is 200 rpm. The alternator 20 is, therefore, started to be driven in the motor mode before the resonance range of the engine 10 is reached to produce a degree of torque required to increase the speed of the engine 10.

Subsequently, at time t14, when the engine speed NE reaches the threshold value TH1, the ECU 30 outputs the alternator off-signal to cancel the alternator drive command to the controller 22. The controller 22 then stops the alternator 20 from moving in the motor mode.

The engine starting system of this embodiment offers the following beneficial advantages.

When it is required to start the engine 10, the ECU 30 energizes the starter 50 to bring the pinion gear 51 into engagement with the ring gear 17 and rotates the output shaft of the starter 50 (i.e., the motor 52). The reaction caused by the compression of the air-fuel mixture in the engine 10 is, as described above, maximized just before the top dead center of the piston in the cylinder 11 is reached, thereby resulting in an increase in pressure acting on the driving tooth faces of the pinion gear 51 and the ring gear 17, which generates the gear noise. After the top dead center of the piston is reached, the above reactive force disappears, so that the speed of rotation of the ring gear 17 becomes higher than that of the pinion gear 51, thereby causing the gear noise to occur which arises from the gear collision or gear rubbing between the pinion gear 51 and the ring gear 17. Such type of gear noise usually becomes great in the event of the first firing of the fuel in the engine 10. The engine starting system of this embodiment is, as described above, engineered to energize the starter 50 and then deenergize it before the ECU 30 starts to execute the fuel combustion control to initiate the first firing. This causes the actuation of the starter 50 and the fuel combustion control not to be achieved simultaneously during the starting operation to start the engine 10. The starter 50 is deenergized before the first firing occurs, thereby enabling the pinion gear 51 to be disengaged from the ring gear 17 prior to the first firing. In other words, the pinion gear 51 is disengaged from the ring gear 17 before the impact occurs between the pinion gear 51 and the ring gear 17 which results from the first firing of fuel. The gear noise which originates from the reaction caused by the compression of air in the cylinder 11 before the first firing takes place is also alleviated. This greatly reduces the gear noise which results from the first firing of fuel in the conventional engine starting systems.

The ECU 30 calculates the first firing top dead center TDCX that is the top dead center of the piston in the compression stroke at which the first firing is expected to occur in the engine 10 during the operation of the starter 50 to crank the engine 10 and then terminates the energization of the starter 50 before the first firing top dead center TDCX is reached. Specifically, the ECU determines that the first firing is expected to occur when the piston in one of the cylinders 11 of the engine 10 reaches the top dead center in the compression stroke thereof and then turns off the starter 50. This enables the engine 10 to continue to rotate at a speed required to initiate the first firing of fuel in the one of the cylinders 11 after the starter 50 is turned off, thereby ensuring the stability in completely starting the engine 10.

The ease with which the pinion gear 51 is disengaged from the ring gear 17 is usually facilitated when the pressure exerted on the tooth faces of the pinion gear 51 and the ring gear 17 is minimized. In light of such a fact, the ECU 30 terminates the energization of the starter 50 immediately before the compression top dead center TDCY one cycle earlier than the first firing top dead center TDCX at which the first firing is achieved. In other words, the starter 50 is turned off before the reaction caused by the compression of the air-fuel mixture in the cylinder 11 is maximized (i.e., immediately before the first firing top dead center TDCX), that is, when the pressure exerted on the tooth faces of the pinion gear 51 and the ring gear 17 has been lowered, thereby facilitating the ease with which the pinion gear 51 is disengaged from the ring gear 17, which result in a decrease in the gear noise.

The development of the first firing of fuel in the cylinders 11 of the engine 10 requires the cylinders 11 to be sufficiently filled with air. The ECU 30 thus starts the fuel combustion control in the condition where a selected one of the cylinders 11 is sufficiently filled with air, thereby achieving the first firing of fuel in the selected cylinder 11 when the piston thereof reaches the top dead center thereof at a determined time. This enables the starter 50 to be turned off before the piston reaches the top dead center in a selected cycle of the compression stroke, i.e., the first firing top dead center TDCX is reached.

The engine 10 is designed to have the fuel injector 12 which sprays fuel directly into each of the cylinders 11. After the energization of the starter 50, the ECU 30 starts spraying the fuel in a selected cycle of the compression stoke of the piston in the selected cylinder 11 immediately before the top dead center is reached in a subsequent cycle of the compression stroke of the piston, thereby achieving the first firing of fuel at the first firing top dead center TDCX.

The engine starting systems designed to use an alternator mechanically joined to the engine rotating shaft 16 at all the time in addition to a starter in the starting mode to start the engine are known. Such a type of engine starting systems actuate the alternator, so that the speed of the engine rises. The engine starting system of this embodiment is, however, engineered to start actuating the alternator 20 before the resonance range of the engine 10 is reached, thereby causing the engine 10 to quickly pass the resonance range while the engine speed NE is increasing. The engine starting system of this embodiment also starts actuating the alternator 20 after the starter 50 is turned off, thereby resulting in a decrease in consumption of electric power.

The development of the first firing of fuel in the engine 10 after the completion of energization of the starter 50 requires the inertial rotation of the engine 10 to be increased more than the reactive force resulting from the compression of the air-fuel mixture in the cylinder 11. To this end, the engine starting system of this embodiment serves to increase the quantity of air delivered into the cylinder 11 of the engine 10 while the starter 50 is cranking the engine 10, which, however, results in an increase in the reactive force. The increase in the reactive force will cause the speed of the engine 10 to be desirably increased in the expansion stroke. The engine starting system, as described above, stops energizing the starter 50 immediate before the compression top dead center TDCY one cycle earlier than the first firing top dead center TDCX. In other words, the engine starting system continues to rotate the starter 50 until just before the compression top dead center TDCY one cycle earlier than the first firing top dead center TDCX, thereby exerting a degree of torque on the engine rotating shaft 16 which is required for the first firing top dead center TDCX to be reached. This provides a degree of inertia rotation to the engine 10 which is required for the piston in the target cylinder 11 to pass over the top dead center after the starter 50 is turned off, thereby ensuring the stability in achieving the first firing of fuel in the engine 10 without undesirably decreasing the speed of the engine 10.

Modifications

The engine starting system of the above embodiment works to determine the first firing top dead center TDCX where the first firing of fuel should be taken place when the condition where the quantity of air with which the target cylinder 11 is filled becomes greater than or equal to the threshold value TH3, but however, may alternatively be designed to calculate the first firing top dead center TDCX as a function of the engine speed NE when a given crank angle (e.g., BTDC45°) is reached. The development of the first firing of fuel usually depends upon an engine condition, such as the temperature of the engine 10. The threshold value for the quantity of fuel with which the target cylinder 11 is filled or the engine speed NE which is used in step S102 or S109 may, therefore, be variably selected as a function of the temperature in the cylinder 11 or the temperature of engine coolant.

The engine starting system of the above embodiment determines the time when the starter 50 should be turned off to be immediately before the compression top dead center TDCY one cycle of the compression stroke earlier than the first firing top dead center TDCX, but however, may alternatively be designed to set the time when the starter 50 should be turned off just to or to be immediately after the compression top dead center TDCY prior to the first firing top dead center TDCX. In other words, the time when the starter 50 should be turned off may be determined to be before the first firing top dead center TDCX as long as the piston in the target cylinder 11 will be moved by the rotational inertia of the engine 10 over the first firing top dead center TDCX, that is, the first firing of fuel will occur at the first firing top dead center TDCX. It is, thus, preferable that the time when the starter 50 should be turned off is set to be around the compression top dead center TDCY one compression cycle earlier than the first firing top dead center TDCX. The starter 50 is, therefore, turned off immediately before the first firing top dead center TDCX, that is, before the reactive force, as produced by the compression of air in the target cylinder 11, is maximized, thereby facilitating the ease with which the pinion 51 is disengaged from the ring gear 17 and reducing the gear noise resulting from the generation of the reactive force and intense gear noise caused by the first firing of fuel in the cylinder 11.

The engine starting system may be designed to decrease the quantity of air with which the cylinders 11 are filled at an early stage of the cranking operation of the starter 50 and then increase it at a subsequent stage of the cranking operation. This results in a decrease in degree of the reactive force arising from the compression of air in the cylinders 11 at the early stage of the cranking operation, thereby reducing the gear noise. The increase in the quantity of air with which the cylinders 11 are filled at the later stage of the cranking operation will facilitate the ease with which fuel is ignited in the cylinder 11, thereby ensuring the stability in achieving the first firing of the fuel at the top dead center. Specifically, the ECU 30 decreases the degree to which the throttle valve 15 is opened until a given period of time passes after the starter 50 starts to be turned on and then increases it until the compression top dead center TDCY one compression cycle earlier than the first firing top dead center TDCX.

The quantity of air delivered into the cylinders 11 may be controlled in a way without use of the throttle valve 15. For instance, the engine 10 may be equipped with variable valve actuators, such as variable valve timing mechanisms, each of which works to variably chance the timing of opening or closing or an opened position of an intake valve installed for a corresponding one of the cylinders 11. The ECU 30 may regulate the quantity of air with which the cylinders 11 are filled using the variable valve actuators.

The engine starting system, as described above, starts energizing the alternator 20 before the resonance range of the engine 10 is reached after the starter 50 is deenergized, but may alternatively be designed to start driving the alternator 20 while the starter 50 is being energized.

The alternator 20 is mechanically connected to the engine rotating shaft 16 through a belt and thus, unlike the starter 50, does not generate intense gear noise upon occurrence of the first firing of fuel in the cylinder 11 while the alternator 20 is operating. The engine starting system of the above embodiment, therefore, works to drive the alternator 20 regardless of the development of the first firing of fuel in the cylinder 11, but however, may alternatively be engineered to select the time at which the alternator 20 is started to be driven in relation to a target timing of the first firing of fuel in the cylinder 11. For instance, the ECU 30 may start driving the alternator 20 before or after the first firing is developed.

The engine 10, as referred to in the above embodiment, is of a direct injection type, but may alternatively be of a port fuel injection type which has a fuel injector installed in an intake pipe.

The alternator 20 which is used as the second starter, as described above, is not equipped with a rotation sensor, but may alternatively be designed to have such a rotation sensor working to measure an angular position of the rotating electrical machine 21.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:

1. An engine starting system for a vehicle equipped with a gear drive type starter which is energized to bring a pinion gear of the starter into engagement with a ring gear of an engine mounted in the vehicle and also to rotate the pinion gear, comprising:
    an energization controller that is configured to terminate energization of said starter after said starter is energized to start the engine;
    a combustion controller that is configured to control combustion of fuel in the engine so as to develop a first firing event where the fuel is first fired in the engine after the energization of said starter is terminated by the energization controller; and
    a processor that is configured to determine, when the starter is rotating the pinion gear to crank the engine, a first firing top dead center where the first firing event is expected to occur;
    wherein:
    the energization controller is configured to terminate the energization of the starter at or before a top dead center one cycle of a piston of the engine earlier than the first firing top dead center.

2. An engine starting system as set forth in claim 1, wherein the processor is configured to determine the first firing top dead center in a condition where a quantity of air with which a cylinder of the engine has been filled is greater than or equal to a given value, and the combustion controller is configured to initiate the combustion control including controlling spraying of the fuel into the engine using a fuel injector before the first firing top dead center is reached.

3. An engine starting system as set forth in claim 2, wherein the fuel injector is configured to inject the fuel directly into the cylinder of the engine, and wherein the combustion controller starts to actuate the fuel injector to inject the fuel into the engine after the energization of the starter is terminated.

4. An engine starting system as set forth in claim 1, wherein the energization controller is configured to terminate the energization of the starter just before a top dead center one compression cycle of the piston of the engine earlier than the first firing top dead center, as determined by the processor.

5. An engine starting system as set forth in claim 1, further comprising an air quantity controller configured to increase a quantity of air sucked into the engine when the starter is rotating the pinon gear to crank the engine.

6. An engine starting system as set forth in claim 1, wherein said energization controller is configured to terminate the energization of the starter when a crankshaft of the engine is between before the first firing top dead center is reached.

7. An engine starting system as set forth in claim 2, wherein the engine starting system decreases the quantity of air at the commencement of energization of the gear drive type starter and increases the quantity of air after a predetermined time period.

8. An engine starting system as set forth in claim 3, wherein the gear drive type starter and a belt-driven starter start the engine.

9. An engine starting system for a vehicle equipped with a gear drive type starter which is energized to bring a pinion gear of the starter into engagement with a ring gear of an engine mounted in the vehicle and also to rotate the pinion gear, comprising:
    an energization controller that is configured to terminate energization of said starter after said starter is energized to start the engine;
    a combustion controller that is configured to control combustion of fuel in the engine so as to develop a first firing event where the fuel is first fired in the engine after the energization of said starter is terminated by the energization controller; and
    a processor that is configured to determine, when the starter is rotating the pinion gear to crank the engine, a first firing top dead center where the first firing event is expected to occur; wherein:

the energization controller is configured to terminate the energization of the starter just before a top dead center one compression cycle of a piston of the engine earlier than the first firing top dead center, as determined by the processor.

\* \* \* \* \*